United States Patent
Sahara (10) Patent No.: US 8,520,655 B2
(45) Date of Patent: Aug. 27, 2013

(54) WIRELESS COMMUNICATION SYSTEM, TRANSMITTING DEVICE, RECEIVING DEVICE AND WIRELESS COMMUNICATION METHOD

(75) Inventor: Toru Sahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 405 days.

(21) Appl. No.: 12/864,844

(22) PCT Filed: Jan. 27, 2009

(86) PCT No.: PCT/JP2009/051281
§ 371 (c)(1),
(2), (4) Date: Jul. 27, 2010

(87) PCT Pub. No.: WO2009/096392
PCT Pub. Date: Aug. 6, 2009

(65) Prior Publication Data
US 2010/0309874 A1 Dec. 9, 2010

(30) Foreign Application Priority Data

Jan. 28, 2008 (JP) .................................. 2008-016972

(51) Int. Cl.
*H04B 7/208* (2006.01)
(52) U.S. Cl.
USPC ............ 370/344; 370/342; 370/347; 455/17; 455/20
(58) Field of Classification Search
USPC ................. 370/342, 329, 252, 230, 229, 344, 370/347; 455/17, 20, 21, 23, 42, 44, 61, 455/102, 110, 126, 130, 205
See application file for complete search history.

(56) References Cited

U.S. PATENT DOCUMENTS

| 6,865,233 B1 | 3/2005 | Eriksson et al. |
| 2005/0008026 A1 | 1/2005 | Tanaka et al. |
| 2005/0050427 A1* | 3/2005 | Jeong et al. .................. 714/755 |
| 2006/0041816 A1 | 2/2006 | Hong et al. |
| 2009/0185577 A1 | 7/2009 | Kishiyama et al. |

FOREIGN PATENT DOCUMENTS

| EP | 1791287 A1 | 5/2007 |
| JP | 2002-537722 | 11/2002 |
| JP | 2005-033399 | 2/2005 |
| JP | 2007-221178 | 8/2007 |

OTHER PUBLICATIONS

Extended European Search Report dated Dec. 20, 2010 issued by the European Patent Office for the corresponding European Application No. EP 09705775.6.
9.2.2. HARQ, pp. 331-340, Oct. 26, 2007.
International Search Report from PCT/JP2009/051281 dated Mar. 24, 2009.
OFDMA/TDMA TDD Broadband Wireless Access System (Next Generation PHS), ARIB STD-T95, Version 1.0, Dec. 12, 2007, full text.
Association of Radio Industries and Businesses, OFDMA/TDMA TDD Broadband Wireless Access System (Next Generation PHS), ARIB STD-T95 Version 1.3, Dec. 16, 2009.

* cited by examiner

*Primary Examiner* — Dady Chery
(74) *Attorney, Agent, or Firm* — Procopio, Cory, Hargreaves & Savitch LLP (57) ABSTRACT

One object of the present invention is to effectively utilize adaptive modulation and improve stability of wireless communication, without departing from standards, by independently controlling MCSs of retransmission data and usual data and using MCS suitable for each data. In the wireless communication system of the present invention, a frame, in which an error occurs, in both a transmitting device and a receiving device and the error part are specified, and MCS used in the frame is specified. Therefore, it is possible to modulate/demodulate the error part based on desired MCS without loading MCS on HARQ.

8 Claims, 9 Drawing Sheets

| MCS IDENTIFIER | MODULATION METHOD | CODING METHOD (Puncturing Rate) | MODULATION EFFICIENCY |
|---|---|---|---|
| 0 | BPSK | 1 | 0.5 |
| 1 | BPSK | 3/4 | 0.67 |
| 2 | QPSK | 1 | 1 |
| 3 | QPSK | 4/6 | 1.5 |
| 4 | Reserved | --- | --- |
| 5 | 16QAM | 1 | 2 |
| 6 | 16QAM | 4/6 | 3 |
| 7 | 64QAM | 3/4 | 4 |
| 8 | 64QAM | 6/10 | 5 |
| 9 | 256QAM | 4/6 | 6 |
| 10 | 256QAM | 8/14 | 7 |

WIRELESS COMMUNICATION SYSTEM, TRANSMITTING DEVICE, RECEIVING DEVICE AND WIRELESS COMMUNICATION METHOD

TECHNICAL FIELD

The present invention relates to a wireless communication system, a transmitting device, a receiving device and a wireless communication method, which are capable of conducting wireless communication using adaptive modulation (high speed adaptive modulation).

BACKGROUND ART

In recent years, as a mobile station represented by PHS (Personal Handy phone System), mobile phone system, and the like have become popular, it has been possible to make calls or obtain information anywhere and anytime. In particular, lately, as an amount of available information has shown steady growth, high speed and high quality wireless communication systems have been introduced in order to download a mass of data.

For example, as next generation PHS communication standards for high speed digital communication, ARIB (Association of Radio Industries and Business) STD T95 and PHS MoU (Memorandum of Understanding) have been proposed, and an OFDM (Orthogonal Frequency Division Multiplexing) scheme is used therefor. OFDM is one of multiplexing schemes. OFDM effectively uses a frequency band by using a plurality of carriers on a unit time axis and making phases of signal waves orthogonal between adjacent carriers to partially overlap bands of the carriers.

In addition, while OFDM assigns sub channels by time division to individual users, there have also been proposed OFDMA (Orthogonal Frequency Division Multiplexing Access) that allows a plurality of users to share all sub channels and assigns sub channels having the highest transmission efficiency to each user.

In ARIB STD T95 or PHS MoU, an modulation and coding scheme (hereinafter referred to as "MCS") determined by adaptive modulation is transmitted to a transmitting device through an anchor channel in an FM-mode (Fast access channel based on Map-Mode) (for example, see Non-Patent Literature 1), and the transmitting device modulates data based on the MCS so that communication using optimum MCS under the communication environment at that time can be conducted.

Such adaptive modulation enables conducting stable wireless communication by: estimating communication environment between a transmitting device and a receiving device based on SINR (Signal to Interference and Noise Ratio) or a bit error rate of an uplink communication signal transmitted from a mobile station to a base station; and choosing MCS having higher modulation efficiency under better communication environment and MCS having low modulation efficiency under bad communication environment.

Moreover, in ARIB STD T95 or PHS MoU, in case where a receiving device receives incorrect data, an automatic repeat request (hereinafter referred to as "ARQ") for requesting retransmission of the data is transmitted to the transmitting device that has transmitted the incorrect data. In response to such ARQ, the transmitting device performs retransmission of data to an MAC layer (low layer), so that the error can be effectively corrected for short control time (Non-Patent Literature 2). In addition, in ARIB STD T95 or PHS MoU, an HARQ (Hybrid ARQ) technique, which more improves packet error correction efficiency by combining such ARQ and FEC (Forward Error Correction), is also employed.

Non-Patent Literature 1: ARIB (Association of Radio Industries and Businesses) STD-T95

Non-Patent Literature 2: A-GN4.00-01-TS Rev. 3 "Next Generation PHS Specifications", P331-340

DISCLOSURE OF THE INVENTION

Problems that the Invention is to Solve

In ARIB STD T95 or PHS MoU, data to be transmitted and received are divided in frame units, and MCS may be set by a minimum unit (PRU: Physical Resource Unit; hereinafter referred to as "PRU") of data in the transmission frame. However, an amount of information to be allocated to MCS becomes massive, thereby unnecessarily occupying data regions. Thus, considering that data in one frame are delivered at almost the same time, in this standard, MCS is designated only once for all frames.

However, in the ARQ described above, MCS of data to be retransmitted must be the same as previously transmitted. In addition, since only one type of MSC can be designated for one frame, all frame data including the retransmission data have been fixed as MCS of the retransmission data, irrespective of radio wave environment at that time.

As a result, optimum MCS secured from the receiving terminal to transmit usual data other than the retransmission data of the frame is cancelled, so that the benefit of adaptive modulation cannot be received. Further, since communication speed is overly fast or slow depending on MCS of the retransmission data, a new error occurs in usual data, so that it may cause the error correction performance (ARQ) to create an error.

In order to avoid such problems, in ARIB STD T95 or PHS MoU, it is possible to stop the function of ARQ and correct an error to an upper layer. However, since ARQ, which is capable of effectively correcting an error for short control time, is not used, error correction time may be prolonged.

In consideration of these problems, the present invention provides a wireless communication system, a transmitting device, a receiving device and a wireless communication method, which are capable of independently controlling MCSs of retransmission data and usual data and using MCS suitable for each data, without departing from standards, to effectively utilize adaptive modulation and improve stability of wireless communication.

Means for Solving the Problems

In order to solve the problems, a representative configuration of the present invention relates to a wireless communication system comprising: a transmitting device that transmits data in frame units modulated based on MCS determined by adaptive modulation and an MCS identifier capable of specifying the MCS; and a receiving device, which is capable of conducting wireless communication with the transmitting device, and which demodulates the received data based on MCS specified by the received MCS identifier, wherein the transmitting device comprises: a transmission data maintaining unit that maintains transmission data and an MCS identifier of MCS modulating the data in association with a frame identifier capable of specifying a frame of the data; a data modulating unit that modulates the data based on the maintained MCS; and a data transmitting unit that transmits the modulated data in sequence, wherein the receiving device comprises: a data receiving unit that receives data from the transmitting device; a data demodulating unit that demodulates the received data; an error detecting unit that detects an error of the demodulated data; a demodulated data maintaining unit which, when an error has been detected in the demodulated data, maintains the demodulated data and an MCS identifier of the data in association with the frame identifier; and an ARQ transmitting unit which, when an error has been detected in the demodulated data, transmits ARQ (Automatic Repeat Request) including a frame identifier of the data and an identifier of an error part, wherein the data modulating unit modulates the error part of the data maintained in the transmission data maintaining unit and specified by the frame identifier and the identifier of the error part in the ARQ based on the MCS maintained in the transmission data maintaining unit, after a predetermined frame from receiving the ARQ, wherein the data transmitting unit retransmits the modulated data, wherein the data demodulating unit demodulates an error part of the received data based on the MCS maintained in the demodulated data maintaining unit, and wherein the receiving device further comprises a chase combining unit for chase combining the demodulated error part and the data maintained in the demodulated data maintaining unit. The wireless communication system is in compliance with ARIB STD T95 or PHS MoU. The ARQ may be HARQ in the wireless communication system.

In an FM-mode of the wireless communication system, only one type of MCS can be designated for one frame. However, since retransmission of an error part is performed at predetermined frame timing, if a frame, in which an error has occurred, in both the transmitting device and the receiving device and the error part are specified, and MCS used in the frame can be specified, the error part can be modulated/demodulated based on desired MCS even without loading MCS on ARQ or HARQ. Accordingly, it is possible to release the requirement area of the MCS to usual data, so that MCS based on adaptive modulation can be set for usual data. Like this, by independently controlling MCSs of retransmission data and usual data and using MCS suitable for each data, it is possible to effectively utilize adaptive modulation and improve stability of wireless communication.

The data modulating unit may dispose an error part of data to be retransmitted by ARQ or HARQ and modulate the error part in a predetermined position within a frame.

According thereto, PRUs of error parts having the same MCS can be intensively disposed at a predetermined position, regardless of disposition and the number of error PRUs in a retransmission frame, and thereby reducing the burden of the modulation process.

In the data modulating unit, MCS may be the same as MCS required by the receiving device or may be MCS having low modulation efficiency.

According thereto, modulation of corresponding data can be performed based on MCS, which is less than the MCS that has been required by the receiving device and can be modulated by the transmitting device, so that more stable wireless communication using optimum MCS for both the receiving device and the transmitting device can be constructed.

Another configuration of the present invention relates to a transmitting device that transmits data in frame units modulated based on MCS determined by adaptive modulation and an MCS identifier capable of specifying the MCS to a receiving device, the transmitting device comprising: a transmission data maintaining unit that maintains transmission data and an MCS identifier of MCS modulating the data in association with a frame identifier capable of specifying a frame of the data; a data modulating unit that modulates the data based on the maintained MCS; and a data transmitting unit that transmits the modulated data in sequence, wherein, upon receiving ARQ (Automatic Repeat Request) from the receiving device, the data modulating unit modulates an error part, which is designated from the receiving device, of the data maintained in the transmission data maintaining unit and specified by a frame identifier and an identifier of an error part in the ARQ based on the MCS maintained in the transmission data maintaining unit, and the data transmitting unit retransmits the modulated data.

According thereto, without departing from standards, the transmitting device independently modulates retransmission data and usual data based on MCS suitable for each data, so that it can effectively utilize adaptive modulation and improve stability of wireless communication.

Still another configuration of the present invention relates to a receiving device that receives data in frame units modulated based on MCS determined by adaptive modulation and an MCS identifier capable of specifying the MCS from a transmitting device, the receiving device comprising: a data receiving unit that receives data from the transmitting device; a data demodulating unit that demodulates the received data; an error detecting unit that detects an error of the demodulated data; a demodulated data maintaining unit which, when an error has been detected in the demodulated data, maintains the demodulated data and an MCS identifier of the data in association with the frame identifier; and an ARQ transmitting unit which, when an error has been detected in the demodulated data, transmits ARQ (Automatic Repeat Request) including a frame identifier of the data and an identifier of an error part, wherein the data demodulating unit demodulates an error part of data received from the transmitting device based on the MCS maintained in the demodulated data maintaining unit, and wherein the receiving device further comprises a chase combining unit that chase combines the demodulated error part and the data maintained in the demodulated data maintaining unit.

According thereto, without departing from standards, the receiving device independently demodulates retransmission data and usual data based on MCS suitable for each data, so that it can effectively utilize adaptive modulation and improve stability of wireless communication.

Still another configuration of the present invention relates to a wireless communication method for conducting wireless communication by using a transmitting device, which transmits data in frame units modulated based on MCS determined by adaptive modulation and an MCS identifier capable of specifying the MCS, and a receiving device, which is capable of conducting wireless communication with the transmitting device and demodulating the received data based on MCS specified by the received MCS identifier, wherein the transmitting device is configured to: maintain transmission data and an MCS identifier of MCS modulating the data in association with a frame identifier capable of specifying a frame of the data; modulate the data based on the maintained MCS; and transmit the modulated data in sequence, wherein the receiving device is configured to: receive data from the transmitting device; demodulate the received data; detect an error of the demodulated data; maintain the demodulated data and an MCS identifier of the data in association with the frame identifier when an error has been detected in the demodulated data; and transmit ARQ (Automatic Repeat Request) including a frame identifier of the data and an identifier of an error part, wherein the transmitting device is further configured to: modulate the error part of the maintained data specified by the frame identifier and the identifier of the error part in the ARQ based on the maintained MCS, after a predetermined frame from receiving the ARQ; and retransmit the modulated data, and wherein the receiving device is further configured to: demodulate an error part of received data based on the maintained MCS; and chase combine the demodulated error part and the maintained data.

According thereto, like the wireless communication system, without departing from standards, MCSs of retransmission data and usual data are independently controlled, and MCS suitable for each data is used, so that it is possible to effectively utilize adaptive modulation and improve stability of wireless communication.

The components or the descriptions thereof, which correspond to the technical concept of the wireless communication system described above, are applicable to the corresponding transmitting device, receiving device, and wireless communication method.

Advantage of the Invention

As described above, the wireless communication system of the present invention independently controls MCSs of retransmission data and usual data and uses MCS suitable for each data without departing from standards. Therefore, it can effectively utilize adaptive modulation and improve stability of wireless communication.

DESCRIPTION OF REFERENCE NUMERALS AND SIGNS

100 . . . Wireless communication system
110 . . . PHS terminal
120 . . . Base station
230 . . . Transmission data maintaining unit
232 . . . Data modulating unit
234 . . . Data transmitting unit
236 . . . HARQ receiving unit
330 . . . Data receiving unit
332 . . . Data demodulating unit
334 . . . Error correcting unit
336 . . . Error detecting unit
338 . . . Demodulated data maintaining unit
340 . . . HARQ transmitting unit
342 . . . Chase combining unit
344 . . . Error transmitting unit
520 . . . Anchor channel
522 . . . Extra channel

BEST MODE FOR CARRYING OUT THE INVENTION

Hereinafter, a preferable embodiment of the present invention will be described in detail with reference to the accompanying drawings. In the embodiment, dimensions, materials, and other particular numerical values, etc., are merely exemplary to facilitate understanding of the invention and should not be construed as limiting the present invention thereto unless otherwise expressly described herein. Meanwhile, in this specification and the drawings, components having substantially the same functions and configurations are denoted by the same reference numeral to omit repeated explanation, and components having no direct relation with the present invention are not illustrated.

Mobile stations, which are represented by PHS terminals, mobile phones, and the like, and base stations, which are fixedly arranged with certain intervals, construct a wireless communication system for conducting wireless communication. In such a wireless communication system, both a base station and a mobile station function as a transmitting device and a receiving device for transmitting and receiving data. In this embodiment, for easy understanding, a base station is explained as a transmitting device, and a mobile station is explained as a receiving device. However, there is no need to say that the reverse configuration is also possible. Herein, the entire wireless communication system will first be described, and thereafter the detailed configuration of a base station and a PHS terminal as a mobile station will be described. In addition, although this embodiment describes a PHS terminal as an example of a mobile station, the mobile station is not limited thereto. Various electronic devices capable of conducting wireless communication, such as mobile phones, note-type personal computers, PDAs (Personal Digital Assistant), digital cameras, music players, car navigators, portable televisions, game devices, DVD players, and remote controllers, can be used as the mobile station.

(First Embodiment: Wireless Communication System 100)

Figure 1:
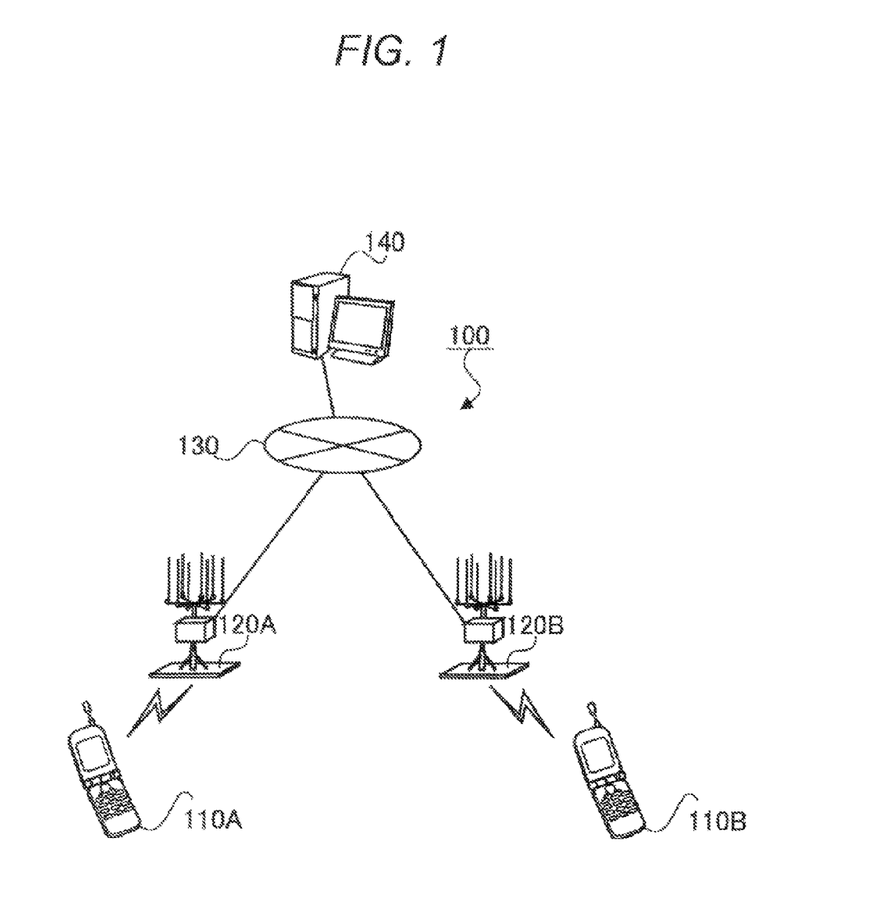
[FIG. 1] An explanatory diagram showing general connection relation of a wireless communication system.

FIG. 1 is an explanatory diagram showing general connection relation of the wireless communication system 100. The wireless communication system 100 comprises: PHS terminals 110 (110A, 110B); base stations 120 (120A, 120B); a communication network 130 including an ISDN (Integrated Services Digital Network) line, Internet, and a private line, and the like; and a relay server 140.

In the wireless communication system 100, when a user makes an access from the user's PHS terminal 110A to the other PHS terminal 110B through a communication line, the PHS terminal 110A makes a request for wireless access to the base station 120A, which lies within communication coverage. Upon receiving the request for wireless access, the base station 120A makes a request for communication access to a communication counterpart to the relay server 140 through the communication network 130. The relay server 140 selects, for example, the base station 120B, which lies within the wireless communication coverage of the other PHS terminal 110B, so as to secure a communication path between the base station 120A and the base station 120B. According thereto, communication between the PHS terminal 110A and the PHS terminal 110B is established.

In this wireless communication system 100, various techniques to improve communication speed and communication quality of the PHS terminals 110 and the base stations 120 have been employed. In this embodiment, for example, the next generation PHS communication technique such as ARIB STD T95 or PHS MoU is employed, and wireless communication based on a TDD (Time Division Duplex)/OFDMA (or TDD/OFDM) scheme is conducted between the PHS terminals 110 and the base stations 120. In addition, in the wireless communication system 100, adaptive modulation also is employed, in which the PHS terminals 110 and the base stations 120 mutually require MCS, and thereby maintaining communication quality, and a modulation method is changed adaptively according to changes in communication environment, and thereby improving communication speed.

In an FM-mode of the wireless communication system 100, only one type of MCS can be designated for one frame. However, retransmission of an error part is performed at predetermined frame timing. Thus, if a frame, in which an error occurs, in both the transmitting device and the receiving device and the error part are specified, and MCS used in the frame can be specified, the error part can be modulated/demodulated based on desired MCS without loading MCS on HARQ. Accordingly, it is possible to release the requirement area of the MCS to usual data (parts other than retransmission data in a frame), so that MCS based on adaptive modulation can be set for usual data. In this manner, by independently controlling MCSs of retransmission data and usual data and using MCS suitable for each data, it is possible to effectively utilize adaptive modulation and improve stability of wireless communication. Hereinafter, the detailed configuration and operation will be explained.

(Base Station 120)

Figure 2:
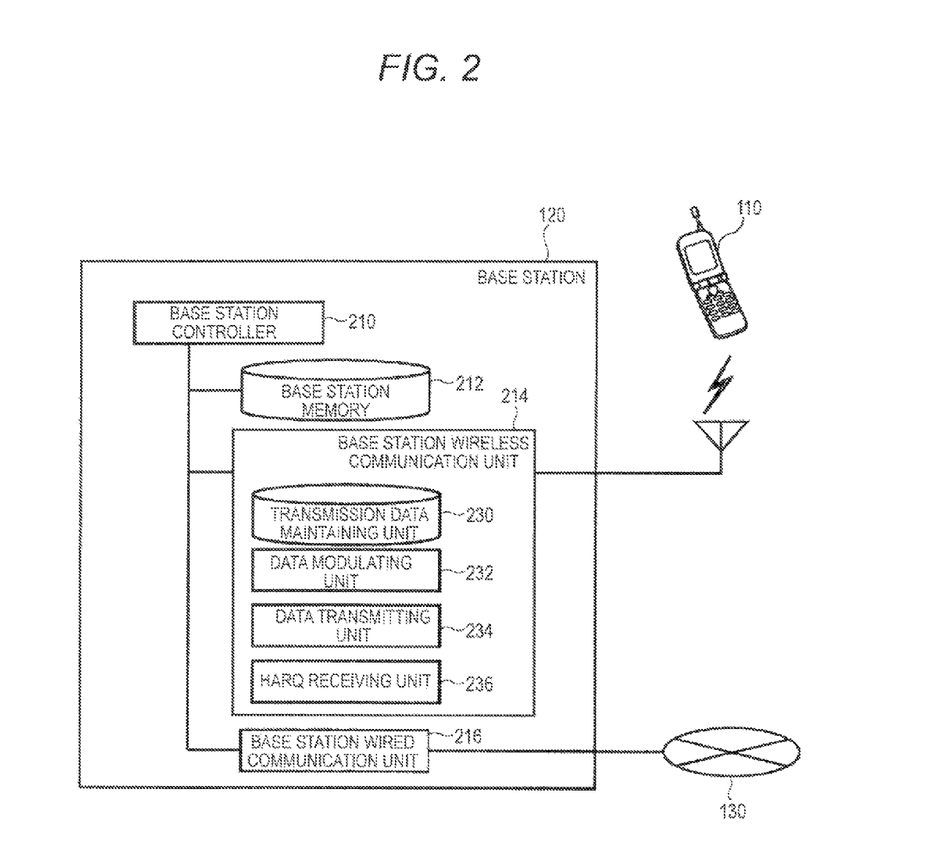
[FIG. 2] A block diagram showing general configuration of a base station.

FIG. 2 is a block diagram showing general configuration of the base station 120. The base station 120 comprises a base station controller 210, a base station memory 212, a base station wireless communication unit 214, and a base station wired communication unit 216.

The base station controller 210 manages and controls the base station 120 as a whole by means of a semiconductor integrated circuit including a central processing unit (CPU). In addition, the base station controller 210 controls communication access to the communication network 130 of the PHS terminal 110 or other PHS terminals 110 using a program of the base station memory 212.

The base station memory 212 is configured by ROM, RAM, EEPROM, non-volatile RAM, flash memory, HDD (Hard Disk Drive), and so on. The base station memory 212 stores programs processed in the base station controller 210, and time information, etc.

The base station wireless communication unit 214 establishes communication with the PHS terminal 110 and performs transmitting and receiving data. In addition, the unit 214 may determine optimum MCS to conduct communication with high efficiency in correspondence to quality of communication with the PHS terminal 110 and request to the PHS terminal 110.

The base station wired communication unit 216 may access various servers including the relay server 140 through the communication network 130.

In addition, in this embodiment, the base station wireless communication unit 214 also functions as a transmission data maintaining unit 230, a data modulating unit 232, a data transmitting unit 234 and an HARQ receiving unit 236.

The transmission data maintaining unit 230 maintains data, which are objects to be transmitted, and to which CRC (Cyclic Redundancy Check Bit) is assigned, and an MCS identifier, which specifies MCS modulating the data, in association with a frame identifier capable of specifying a frame of the data. In this embodiment, an "identifier" refers to indication, which can uniquely specify an object by means of numerals, alphabets and symbols.

The data modulating unit 232 modulates data based on the maintained MCS and generates a baseband signal. Here, the MCS is the same as MCS required by the PHS terminal 110 or MCS with low modulation efficiency. According thereto, modulation of the corresponding data can be conducted based on MCS, which is less than the MCS that has been required by the PHS terminal 110 and can be modulated by the base station 120. Therefore, more stable wireless communication using optimum MCS for both the PHS terminal 110 and the base station 120 can be constructed.

In addition, when a request for HARQ has been made from the PHS terminal 110, the data modulating unit 232 modulates the error part (retransmission data) of the data maintained in the transmission data maintaining unit 230 and specified by the frame identifier and the identifier of the error part, which are objects of HARQ, based on the MCS maintained in the transmission data maintaining unit 230, and data (usual data) other than the error part based on MCS determined by adaptive modulation. Timing of this modulation and the transmission timing in subsequent stages are determined by standards.

Moreover, when a request for HARQ has been made from the PHS terminal 110, the data modulating unit 232 may modulate the error part of the data retransmitted by HARQ by disposing it in a predetermined position within a frame. According thereto, regardless of disposition and the number of error PRUs in a retransmission frame, PRUs of error parts having the same MCS can be intensively disposed at a predetermined position, and thereby reducing the burden of the modulation process.

The data transmitting unit 234 transmits data in frame units modulated by the data modulating unit 232 and an MCS identifier capable of specifying the MCS. In addition, when a request for HARQ has been made from the PHS terminal 110, the data transmitting unit 234 retransmits retransmission data and usual data, which are modulated by the data modulating unit 232, at frame timing predetermined in the wireless communication system 100. In this case, the MCS identifier represents MCS of usual data.

When there has been HARQ from the PHS terminal 110, the HARQ receiving unit 236 extracts a frame identifier of data, which is included in an anchor channel, and in which an error has occurred, and an identifier of the error part, and specifies the data and the error part.

(PHS Terminal 110)

Figure 3:
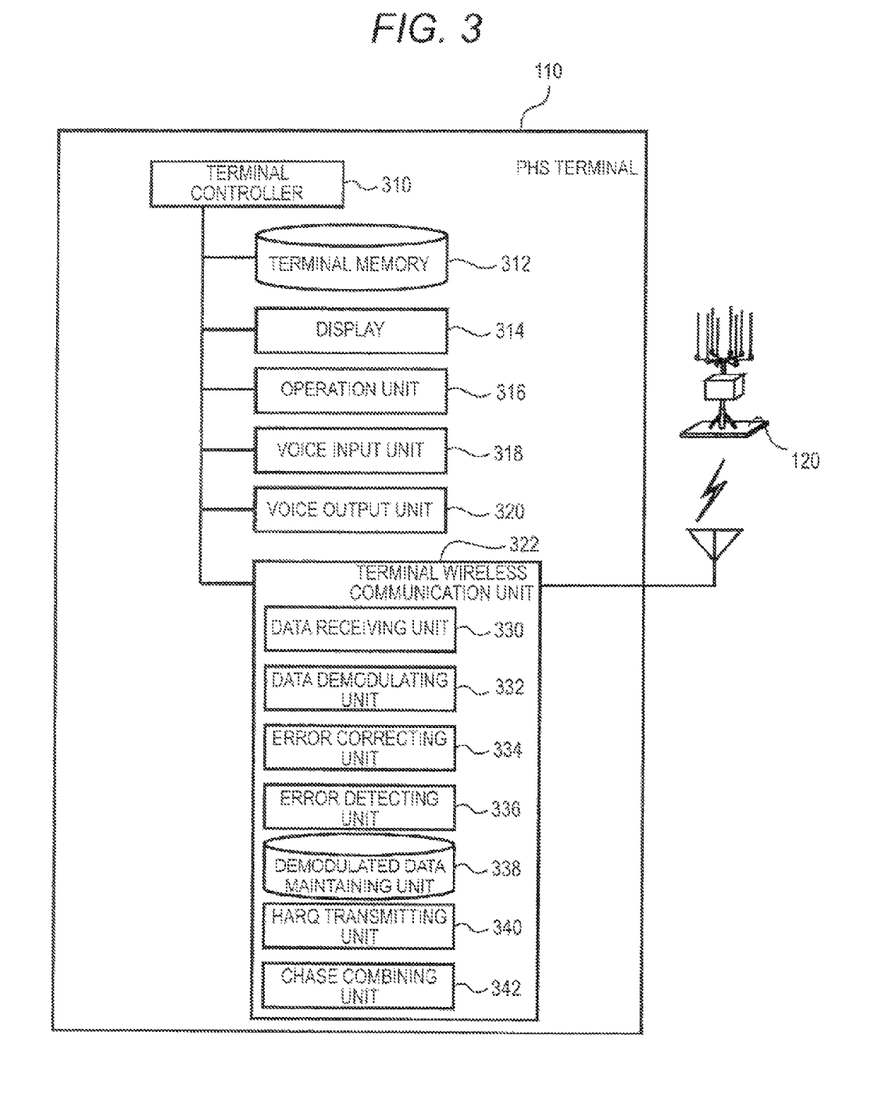
[FIG. 3] A functional block diagram showing hardware configuration of a PHS terminal.
Figure 4:
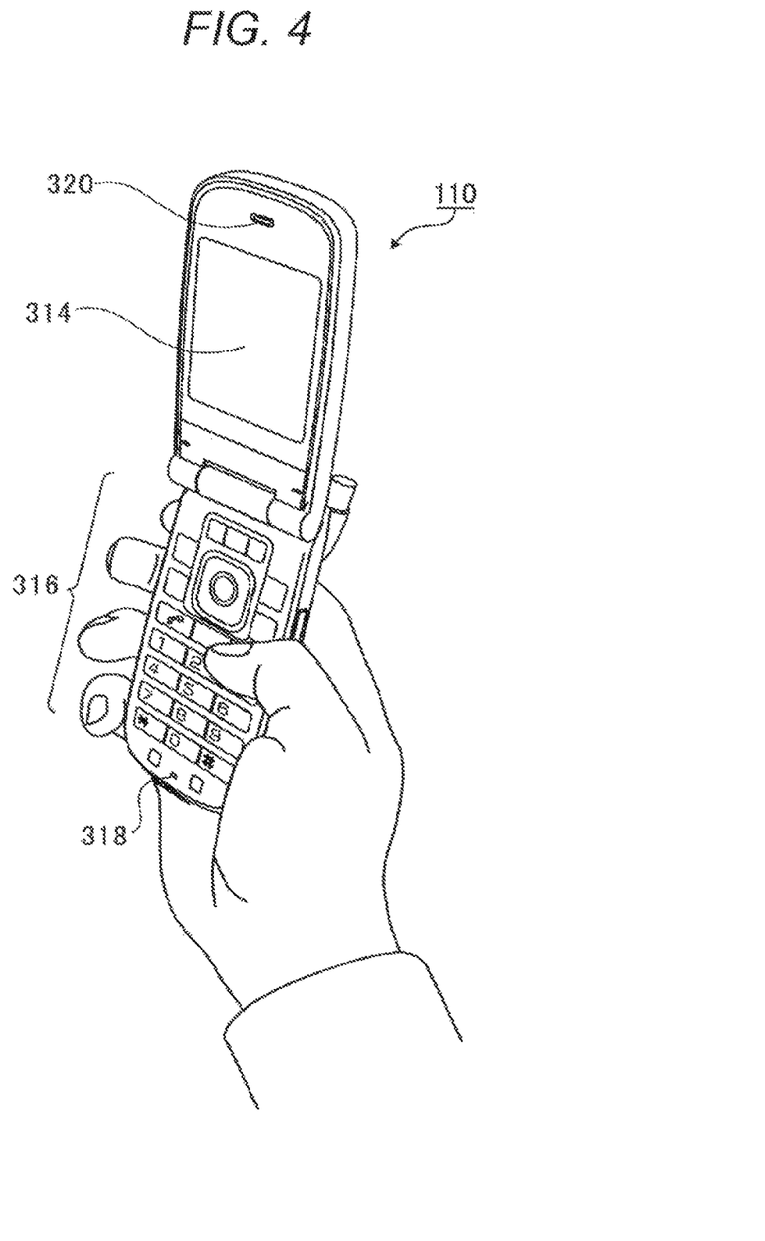
[FIG. 4] A perspective view showing the PHS terminal.

FIG. 3 is a functional block diagram showing hardware configuration of the PHS terminal 110. FIG. 4 is a perspective view showing the PHS terminal 110. The PHS terminal 110 comprises: a terminal controller 310; a terminal memory 312; a display 314; an operation unit 316; a voice input unit 318; a voice output unit 320; and a terminal wireless communication unit 322.

The terminal controller 310 manages and controls the PHS terminal 110 as a whole by means of a semiconductor integrated circuit including a central processing unit (CPU). In addition, the terminal controller 310 also performs call function, mail transmitting and receiving function, imaging function, music playing function, and TV viewing function by using a program of the terminal memory 312.

The terminal memory 312 is configured by ROM, RAM, EEPROM, non-volatile RAM, flash memory, HDD, and so on. The terminal memory 312 stores programs processed in the terminal controller 310, and voice data, etc.

The display 314 is configured by a liquid crystal display, EL (Electro Luminescence), and so on. The display 314 can display Web Browser or GUI (Graphical User Interface) of application, stored in the terminal memory 312 or provided from an application relay server (not illustrated) through the communication network 130.

The operation unit 316 is configured by switches such as a keyboard, a cross key, and a joystick for accepting user's operation input.

The voice input unit 318 is configured by voice recognition means such as a microphone. The voice input unit 318 converts user's voice input during call into an electric signal, which can be processed in the PHS terminal 110.

The voice output unit 320 is configured by a speaker. The voice output unit 320 converts call counterpart's voice signal received in the PHS terminal 110 into voice and output the voice. In addition, the unit 320 can output ringtones, operation sound of the operation unit 316, and alarm sound, etc.

The terminal wireless communication unit 322 establishes wireless communication with the base station 120 in the communication network 130 to transmit and receive data. When establishing communication, the terminal wireless communication unit 322 transmits TCCH (Timing Control Channels) including a synchronization signal to the base station 120. The base station 120 performs sampling of a synchronization symbol from the TCCH and determines transmission timing of the PHS terminal 110, in which the differential is returned to the PHS terminal 110 by using SCCH (Synchronization Control Channels).

In addition, in this embodiment, the terminal wireless communication unit 322 also functions as a data receiving unit 330, a data demodulating unit 332, an error correcting unit 334, an error detecting unit 336, a demodulated data maintaining unit 338, an HARQ transmitting unit 340, and a chase combining unit 342.

The data receiving unit 330 receives data and an MCS identifier from the base station 120.

The data demodulating unit 332 demodulates data based on MCS specified by the MCS identifier received by the data receiving unit 330 and transfers the demodulated data to the error correcting unit 334. In addition, when data including retransmission data have been received at predetermined frame timing after the PHS terminal 110 requests HARQ, the data demodulating unit 332 demodulates retransmission data of the received data based on MCS specified by an MCS identifier maintained in the demodulated data maintaining unit 338, which will be described later, and demodulates usual data based on MCS specified by the received MCS identifier to transfer them to the chase combining unit 342.

The error correcting unit 334 performs error correction of the data transferred from the data demodulating unit 332 or the chase combining unit 342, through CRC (Cyclic Redundancy Check Bit).

The error detecting unit 336 detects an error, which could not have been corrected even by the error correcting unit 334. When the error detecting unit 336 has detected an error, the demodulated data maintaining unit 338 maintains the demodulated data and an MCS identifier of the data in association with a frame identifier.

When the error detecting unit 336 has detected an error, the HARQ transmitting unit 340 transmits HARQ including the frame identifier of the data and the identifier of the error part to the base station 120. In this embodiment, since data in frame units are alternatively transmitted and received between the HARQ transmitting unit and the base station 120 through a TDD/OFDMA scheme, HARQ is transmitted by using an anchor channel of transmission data to be transmitted to the base station 120. In this case, a MCS requirement (MR) set as an identical anchor channel is MCS based on general adaptive modulation.

The chase combining unit 342 chase combines the retransmission data demodulated by the data demodulating unit 332 and the data maintained in the demodulated data maintaining unit 338, and transfers the combined data to the error correcting unit 334.

In the wireless communication system 100 that has been described, by using a communication path between two devices, herein, the PHS terminal 110 and the base station 120, both can perform error correction via HARQ. In addition, regardless of changes in communication environment, optimum MCS can be used.

Next, a wireless communication method of conducting wireless communication using the PHS terminal 110 and the base station 120 described above will be described.

(Wireless Communication Method)

Figure 5:
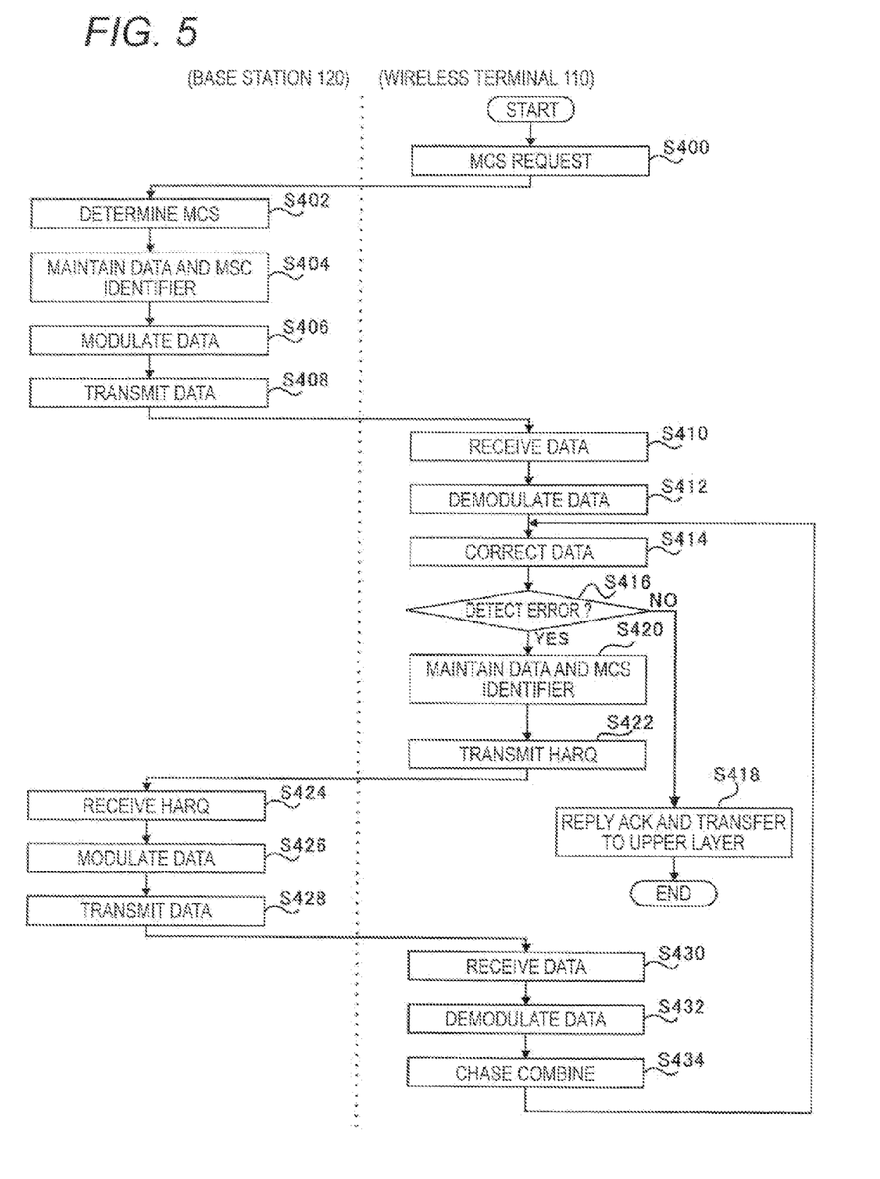
[FIG. 5] A flow chart showing a flow of process in a wireless communication method.
Figure 6:
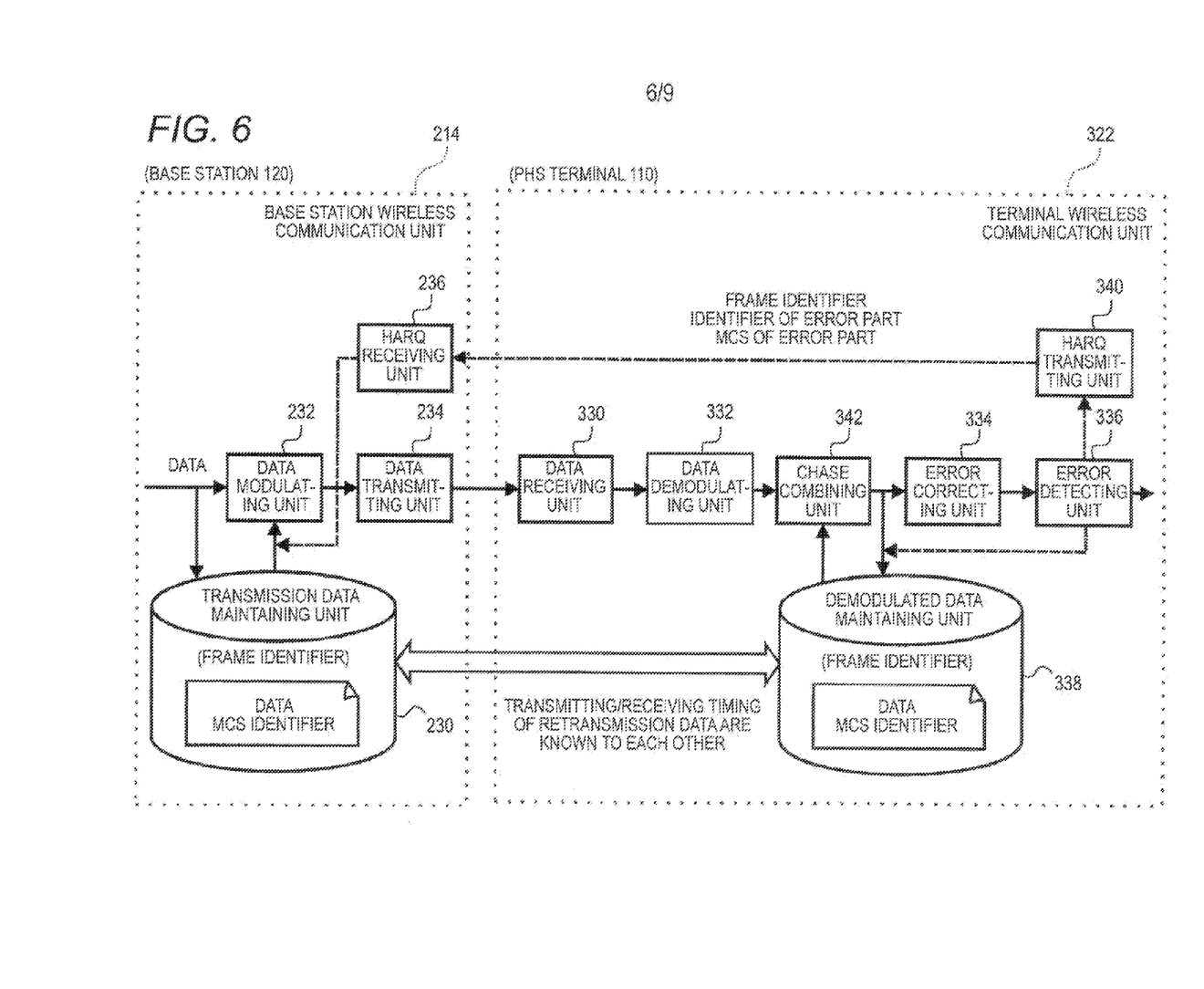
[FIG. 6] A block diagram for supplemental explanation of the flow chart in FIG. 5.

FIG. 5 is a flow chart showing a flow of process in a wireless communication method. FIG. 6 is a block diagram for supplementary explanation of the flow chart in FIG. 5.

Firstly, the PHS terminal 110 requires MCS through an anchor channel of transmission data (S400). The base station 120 determines MCS of data to be transmitted according to the required MCS (S402). And, the base station 120 once maintains transmission data and an MCS identifier of MCS modulating the data in association with a frame identifier in the transmission data maintaining unit 230 (S404). The data maintained in the transmission data maintaining unit 230 are maintained until elapsing of predetermined time, during which it can be regarded that HARQ is not being generated.

Figure 7:
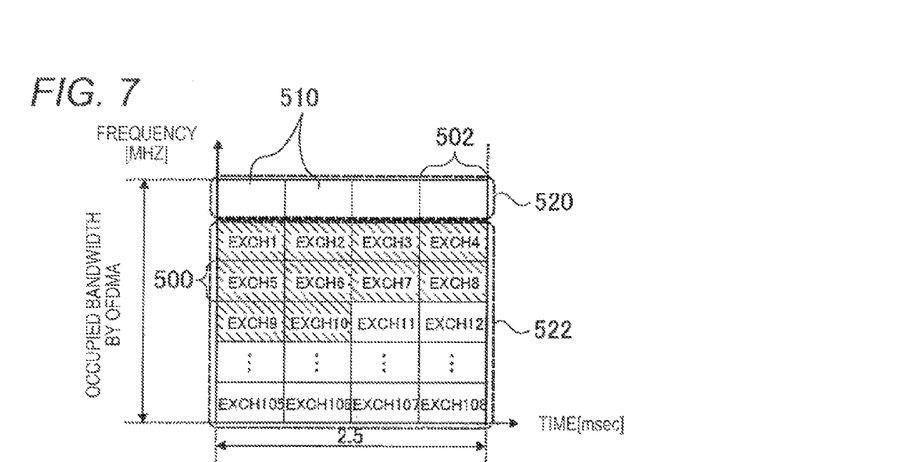
[FIG. 7] An explanatory diagram for explaining frame configuration of data to be transmitted.

FIG. 7 is a view for explaining frame configuration of data to be transmitted. In OFDMA (or OFDM), a map two-dimensionalized in time axis and frequency axis directions is provided, a plurality of channels 500 are arranged in the frequency axis direction with a constant base band distance, and PRU 510 is disposed for each TDMA slot 502 in each channel 500. Accordingly, PRU 510 is defined by an occupation band of 900 kHz according to the base band distance and the duration of 625 μsec by time division. In addition, a frame is composed of an anchor channel (ANCH) 520 related to a control signal and an extra channel (EXCH) 522 which stores data.

The anchor channel 520 is a control signal of FM-Mode. The anchor channel 520 includes, for example, MI (Mcs Indicator), MR (Mcs Requirement), a map and an ACK field. Here, MI represents an MCS identifier of MCS when data is modulated in the corresponding base station 120. MR is MCS requirement of data which is transmitted to itself. From a temporal standpoint, MI represents MCS used for modulation of data, which are transmitted at the same time with a corresponding MCS identifier, and MR represents desired MCS after the next time. Accordingly, MCS required in MR is reflected at least one frame later after the requirement. In addition, in HARQ of this embodiment, since MR transmitted from the PHS terminal 110 to the base station 120 can use MCS based on general adaptive modulation, regardless of MCS of retransmission data, MI from the base station 120 also can use MCS of usual data.

In addition, the map exists only in a frame of transmission from the base station 120 to the PHS terminal 110 and represents assignment of the extra channel 522. The ACK field represents results of error detection of demodulated data. If data are normally received, ACK is stored. If an error is detected, NACK and bit streams necessary to specify the error part are stored. The unit for error detection represented by such bit streams may be each PRU, or one PRU or a plurality of PRUs as a detection unit of CRC.

The extra channel 522 is PRU allocated for each user as a communication path in an FM-Mode and may be assigned in plural to one user. For example, in the example of FIG. 7, EXCH1~EXCH10 presented by diagonal lines are opened to users, whereby data are transmitted using EXCH1~EXCH10. Assignment of such an extra channel 522 is conducted through carrier sense, which determines whether or not PRU is being used by other users. Results of the assignment are shown in a map of the anchor channel 520 as described above.

Subsequently, the data modulating unit 232 of the base station 120 modulates data by using the MCS (S406), and the data transmitting unit 234 transmits the modulated data to the PHS terminal 110 (S408).

Figure 8:
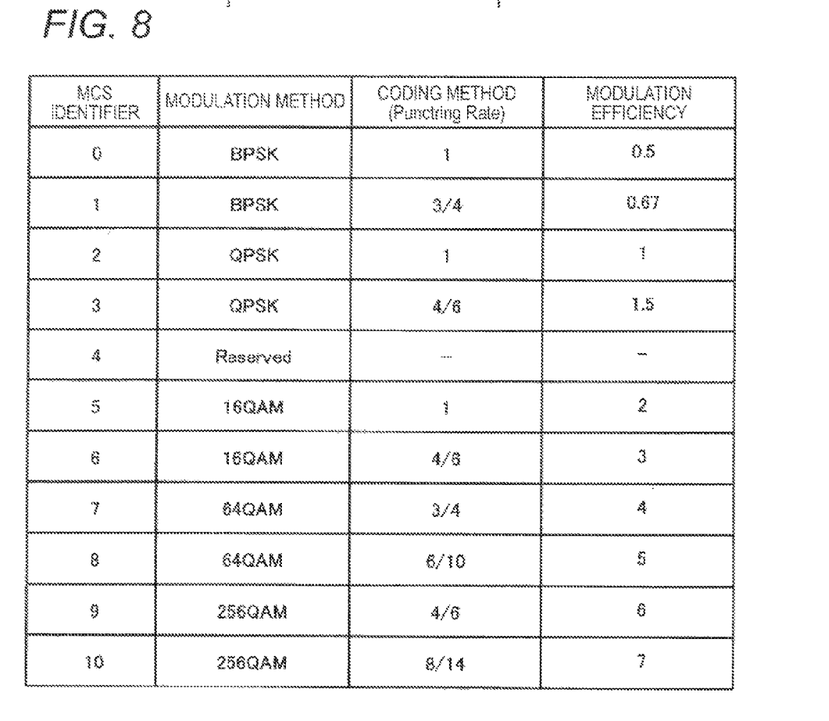
[FIG. 8] An explanatory diagram for explaining classes of MCS.

FIG. 8 is an explanatory diagram for explaining classes of MCS. In this embodiment, for example, 11 classes of MCS are provided, and in each class, a modulation method and a coding method are prepared. In FIG. 8, as values of an MCS identifier increase, modulation efficiency increases.

Subsequently, the data receiving unit 330 of the PHS terminal 110 receives data and an MCS identifier from the base station 120 (S410). Then, the data demodulating unit 332 demodulates the data based on MCS specified by the MCS identifier (S412), and the error correcting unit 334 performs error correction of the data (S414). Here, the error detecting unit 336 detects whether there is an error, which could not have been corrected even by the data error correcting unit 334 (S416). If there is no error left, ACK is replied to the base station 120, and the data are transferred to an upper layer (for example, the terminal control unit 310) (S418).

If an error has been detected in the error detecting step (S416), the demodulated data maintaining unit 338 maintains the demodulated data and an MCS identifier of the data in association with a frame identifier (S420). The HARQ transmitting unit 340 transmits HARQ by using an ACK field containing NACK, the frame identifier and the identifier of the error part (S422).

Figure 9:
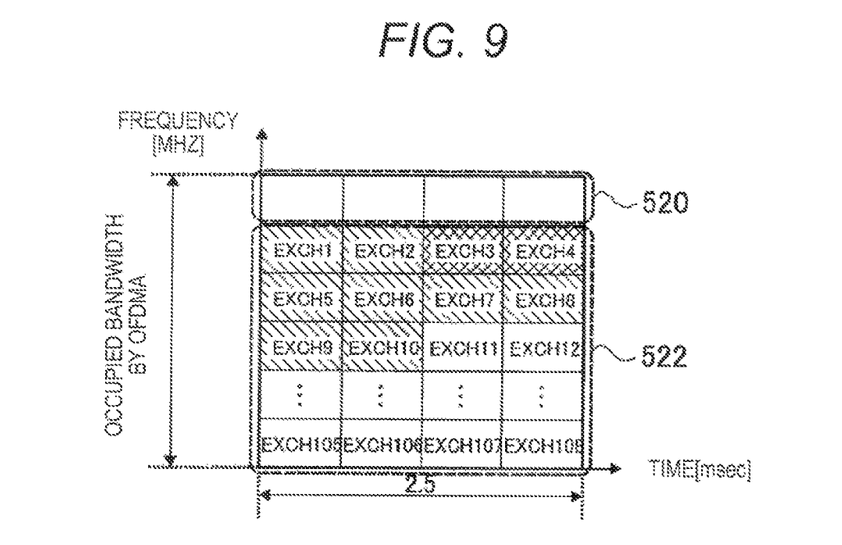
[FIG. 9] An explanatory diagram for explaining an error part in a frame.

FIG. 9 is an explanatory diagram for explaining an error part in a frame. In this embodiment, since the unit for error detection is two PRUs, for example, even if there have been errors in EXCH4 which is one PRU, the error parts are EXCH3 and EXCH4 presented by cross hatching in the extra channel 522 of FIG. 9. In this case, identifiers of the error parts in the anchor channel 520 are, for example, "3" and "4".

In such an HARQ transmitting step (S422), it is characteristic that MCS of a frame causing an error is not transmitted to the PHS terminal 110. In this embodiment, by specifying a frame causing an error and the error part in the PHS terminal 110 and the base station 120, MCS used in the frame is specified. Thus, the error part can be modulated/demodulated based on desired MCS without loading MCS on HARQ. Accordingly, since the requirement area of the MCS can be released to usual data, MCS based on adaptive modulation can be set.

The HARQ receiving unit 236 of the base station 120 receives the HARQ (S424). The data modulating unit 232 modulates the error part (retransmission data) of the data, which has been maintained in the transmission data maintaining unit 230, and which has been specified by the frame identifier and the error part identifier in the ACK field, based on the MCS maintained in the transmission data maintaining unit 230 after a predetermined frame (S426).

Figure 10:
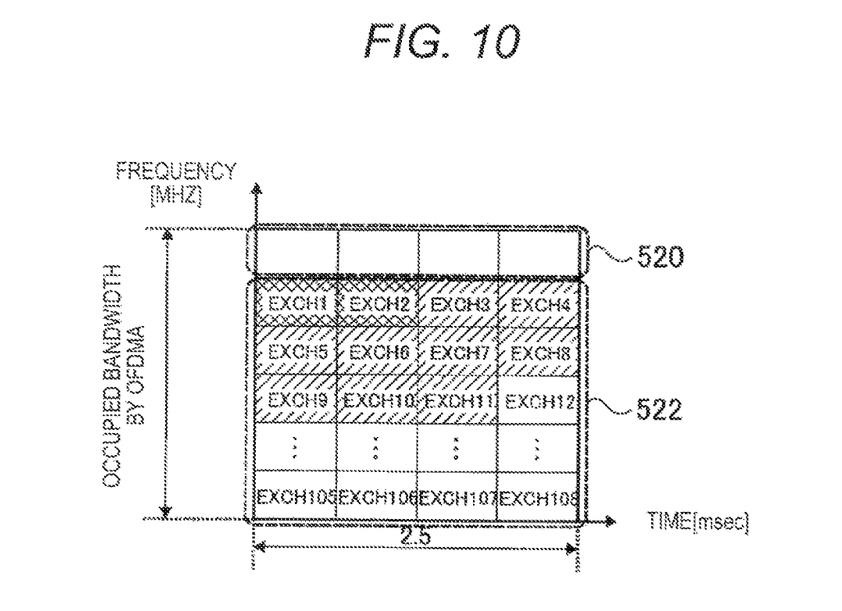
[FIG. 10] An explanatory diagram for explaining position relation between retransmission data and usual data.

FIG. 10 is an explanatory diagram for explaining position relation between retransmission data and usual data. Although EXCH3 and EXCH4 of the data have been designated as error parts from the PHS terminal 110, in a frame to be retransmitted, the error parts are arranged in a predetermined position of the frame, herein, filled and arranged at the head (presented by cross hatching in FIG. 10). And, other usual data are disposed following the retransmission data (presented by orthogonal lines in FIG. 10).

Subsequently, the data transmitting unit 234 of the base station 120 transmits the modulated data to the PHS terminal 110 (S428). When the data receiving unit 330 of the PHS terminal 110 receives the data (S430), the data demodulating unit 332 demodulates retransmission data of the received data based on the MCS maintained in the demodulated data maintaining unit 338, at prescribed HARQ timing, and demodulates usual data based on MCS determined by adaptive modulation (S432). Thereafter, the chase combining unit 342 chase combines the demodulated error part and the data maintained in the demodulated data maintaining unit (S434).

Figure 11:
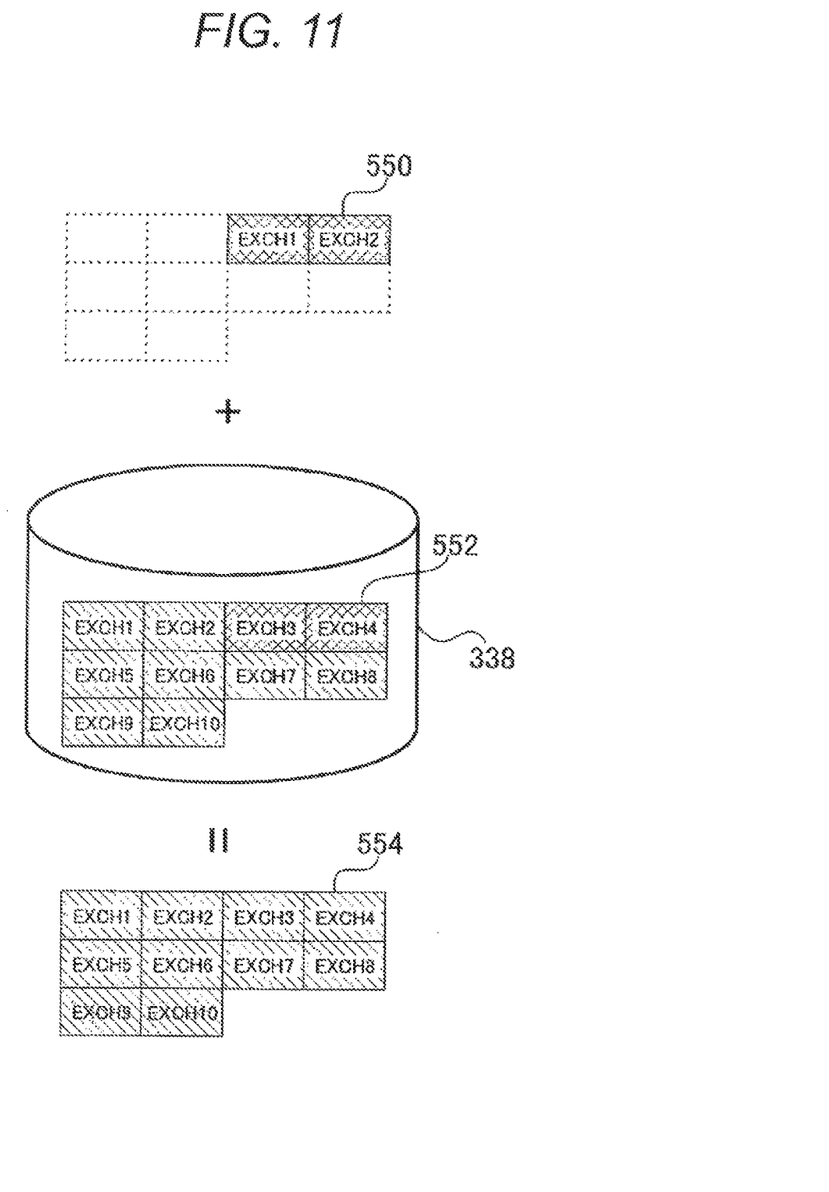
[FIG. 11] An explanatory diagram for explaining performance of chase combining.

FIG. 11 is an explanatory diagram for explaining operation of chase combining. If an error has been detected in the data received and demodulated by the PHS terminal 110, only the error part is delivered together with NACK to the base station 120, while the frame, in which the error has been detected, is not destroyed and maintained in the demodulated data maintaining unit 338. And, when receiving only the error part as retransmission data 550 from the base station 120, the PHS terminal 110 combines the retransmission data 550 and the data 552 maintained in the demodulated data maintaining unit 338 through MRC (Maximum Ratio Combining) to generate restore data 554. In such a chase combining method, as a result of maximum ratio combining of data, SINR of a received frame can be improved, and errors can be effectively reduced.

The data, in which the error part has been restored in this way, are delivered finally to an upper layer (S418), like initially received data, by repeating the data correcting step (S414) and the following steps (S418).

In the above-described wireless communication method as well, without departing from standards, MCSs of retransmission data and usual data are independently controlled, and MCS suitable for each data is used, so that it is possible to effectively utilize adaptive modulation and improve stability of wireless communication.

While the preferable embodiment of the present invention has been described with reference to the accompanying drawings, it goes without saying that the present invention is not limited to the above-described embodiment. It is apparent to one skilled in the art that various modifications and changes can be made within the scope set forth in the claims, and it should be understood that such modifications and changes fall under the technical scope of the present invention.

Incidentally, steps in the wireless communication method described in this specification do not need to be performed in the order described in the flow chart and may be performed in parallel or individually (for example, parallel processes or processes by objects).

While the present invention has been described in detail with reference to a particular embodiment, it is apparent to one skilled in the art that various modifications and changes can be made without departing from the spirit and the scope of the present invention.

The present application is based on Japanese Patent Application No. 2008-016972 filed on Jan. 28, 2008, the disclosures of which are herein incorporated by reference.

Industrial Applicability

The present invention is applicable to a wireless communication system, a transmitting device, a receiving device, and a wireless communication method, which are capable of conducting wireless communication using adaptive modulation (high speed adaptive modulation).

The invention claimed is:

1. A wireless communication system comprising:
a transmitting device that transmits data in frame units that are modulated based on MCS (Modulation and Coding Scheme) determined by adaptive modulation and an MCS identifier that specifies MCS; and
a receiving device, which is configured to conduct wireless communication with the transmitting device, and demodulate received data based on MCS specified by the received MCS identifier;
wherein the transmitting device comprises
a transmission data maintaining unit that maintains transmission data and an MCS identifier of MCS modulating the transmission data in association with a frame identifier that specifies a frame of the transmission data,
a data modulating unit that modulates the transmission data based on the maintained MCS, and
a data transmitting unit that transmits the modulated data in sequence;
wherein the receiving device comprises,
a data receiving unit that receives data from the transmitting device;
a data demodulating unit that demodulates the received data,
an error detecting unit that detects an error of the demodulated data,
a demodulated data maintaining unit which, when an error has been detected in the demodulated data, maintains the demodulated data and an MCS identifier of the data in association with the frame identifier, and
an ARQ transmitting unit which, when an error has been detected in the demodulated data, transmits ARQ (Automatic Repeat Request) including a frame identifier of the data and an identifier of an error part;
wherein the data modulating unit modulates the error part of the data maintained in the transmission data maintaining unit and specified by the frame identifier and the identifier of the error part in the ARQ based on the MCS maintained in the transmission data maintaining unit, after a predetermined frame from receiving the ARQ;
wherein the data transmitting unit retransmits the modulated data;
wherein the data demodulating unit demodulates an error part of the received data based on the MCS maintained in the demodulated data maintaining unit; and
wherein the receiving device further comprises a chase combining unit for chase combining the demodulated error part and the data maintained in the demodulated data maintaining unit.

2. The wireless communication system according to claim 1, wherein the data modulating unit disposes an error part of data to be retransmitted by ARQ and modulates the error part in a predetermined position within a frame.

3. The wireless communication system according to claim 1, wherein in the data modulating unit, MCS is the same as MCS required by the receiving device or MCS having low modulation efficiency.

4. The wireless communication system according to claim 1, wherein the wireless communication system is in compliance with ARIB STD T95 or PHS MoU, and wherein the ARQ is HARQ (Hybrid ARQ) in the wireless communication system.

5. The wireless communication system according to claim 1, wherein the data modulating unit modulates data other than the error part based on MCS determined by adaptive modulation, and wherein the data demodulating unit demodulates data other than the error part based on MCS determined by adaptive modulation.

6. A transmitting device that transmits data in frame units modulated based on MCS (Modulation and Coding Scheme) determined by adaptive modulation
and an MCS identifier that specifies the MCS to a receiving device, the transmitting device comprising:
a transmission data maintaining unit that maintains transmission data and an MCS identifier of MCS modulating the transmission data in association with a frame identifier that specifies a frame of the transmission data;
a data modulating unit that modulates the transmission data based on the maintained MCS; and
a data transmitting unit that transmits the modulated data in sequence;
wherein, upon receiving ARQ (Automatic Repeat Request) from the receiving device, the data modulating unit modulates an error part, which is designated from the receiving device, of the data maintained in the transmission data maintaining unit and specified by a frame identifier and an identifier of an error part in the ARQ~based on the MCS maintained in the transmission data maintaining unit, and
the data transmitting unit retransmits the modulated data;
wherein the data modulating unit modulates data other than the error part based on MCS determined by adaptive modulation.

7. A receiving device that receives data in frame units modulated based on MCS (Modulation and Coding Scheme) determined by adaptive modulation and an MCS identifier that specifies the MCS from a transmitting device, the receiving device comprising:
a data receiving unit that receives data from the transmitting device;
a data demodulating unit that demodulates the received data;
an error detecting unit that detects an error of the demodulated data;
a demodulated data maintaining unit which, when an error has been detected in the demodulated data, maintains the demodulated data and an MCS identifier of the data in association with the frame identifier; and
an ARQ transmitting unit which, when an error has been detected in the demodulated data, transmits ARQ (Automatic Repeat Request) including a frame identifier of the data and an identifier of an error part,
wherein the data demodulating unit demodulates data, other than the error part, based on MCS determined by adaptive modulation,
wherein the data demodulating unit demodulates an error part of data received from the transmitting device based on the MCS maintained in the demodulated data maintaining unit, and
wherein the receiving device further comprises a chase combining unit that chase combines the demodulated error part and the data maintained in the demodulated data maintaining unit.

8. A wireless communication method for conducting wireless communication by using a transmitting device, which transmits data in frame units modulated based on MCS (Modulation and Coding Scheme) determined by adaptive modulation and an MCS identifier that specifies the MCS, and a receiving device, which is configured to conduct wireless communication with the transmitting device and demodulate the received data based on MCS specified by the received MCS identifier, the method comprising:

by the transmitting device,
    maintaining transmission data and an MCS identifier of MCS modulating the data in association with a frame identifier that specifies a frame of the data,
    modulating the data based on the maintained MCS, and
    transmitting the modulated data in sequence;
  by the receiving device,
    receiving data from the transmitting device,
    demodulating the received data,
    detecting an error of the demodulated data,
    maintaining the demodulated data and an MCS identifier of the data in association with the frame identifier when an error has been detected in the demodulated data, and
    transmitting ARQ (Automatic Repeat Request) including a frame identifier of the data and an identifier of an error part;
  by the transmitting device,
    modulating the error part of the maintained data specified by the frame identifier and the identifier of the error part in the ARQ based on the maintained MCS, after a predetermined frame from receiving the ARQ,
    modulating data other than the error part based on MCS determined by adaptive modulation, and
    retransmitting the modulated data; and
  by the receiving device,
    demodulating an error part of received data based on the maintained MCS,
    chase combining the demodulated error part and the maintained data, and
    demodulating data other than the error part based on MCS determined by adaptive modulation.

\* \* \* \* \*